United States Patent [19]

Schwitzgebel

[11] Patent Number: 4,824,577

[45] Date of Patent: Apr. 25, 1989

[54] PHENOL, MELAMINE, FORMALDEHYDE REMOVAL PROCESS

[76] Inventor: Klaus Schwitzgebel, 7507 Chimney Corners, Austin, Tex. 78701

[21] Appl. No.: 86,073

[22] Filed: Aug. 17, 1987

[51] Int. Cl.$^4$ ................................................ C02F 9/00
[52] U.S. Cl. .................................... 210/665; 210/668; 210/669; 210/694
[58] Field of Search ............... 210/663, 668, 669, 694, 210/665

[56] References Cited

U.S. PATENT DOCUMENTS 4,113,615  9/1978  Gorbaty ............................. 210/694

Primary Examiner—Ivars Cintins
Attorney, Agent, or Firm—Joseph F. Long

[57] ABSTRACT

A process is described for removing phenol and formaldehyde from one aqueous waste stream and melamine and formaldehyde from a second aqueous waste stream with the process being adaptable for treating either stream or both streams simultaneously using a urotropination reaction to render formaldehyde removable by carbon adsorption.

10 Claims, 1 Drawing Sheet

PHENOL, MELAMINE, FORMALDEHYDE REMOVAL PROCESS

BACKGROUND OF THE INVENTION

This invention pertains to removal of phenol, formaldehyde, and melamine from waste water wash streams.

In the manufacture of phenol-formaldehyde resins necessary equipment wash produces a waste wash water stream containing too much phenol and formaldehyde to be discharged into the sewers or into natural run-off waters such as rivers or lakes.

In the same way in the manufacture of melamine-formaldehyde resins equipment wash produces waste water wash streams containing too much formaldehyde and melamine to be dumped into our natural drainage. In many states governmental regulations require removal of phenol and formaldehyde and it would be desirable to remove melamine to reduce the biological oxygen demand in our natural run-off streams.

Since, in some instances, phenol-formaldehyde and melamine-formaldehyde resins are produced in the same plant a process for removing phenol and formaldehyde from the waste water wash stream from the phenol-formaldehyde resin plant and melamine and formaldehyde from the waste wash water from the melamine formaldehyde plant would be desirable. Accordingly it is an objective of this invention to most economically remove phenol, formaldehyde and melamine from waste water wash streams from both phenol-formaldehyde and melamine-formaldehyde plastic manufacturing plants. A further objective is to be able to treat either stream or both streams in a most economical manner. Normally only a few thousand gallons per week from a plant must be treated and in such small volumes carbon adsorbtion may be used to remove harmful organics and allow for easy incineration or landfill disposal of the organic loaded carbon. Melamine and phenol are adsorbed on carbon beds but formaldehyde itself is not. However, we found that formaldehyde may be reacted with ammonia to form hexamethylene tetramine or urotropine which does adsorb on carbon. The novel approach lies in securing full loading of the carbon to remove phenol; in removing or modifying interfering reactants to secure a sufficient urotropination reaction; in securing low cost precipitation removal of much of the melamine-formaldehyde in the melamine-formaldehyde stream; in securing a precipitation removal of much of phenol-formaldehyde in that stream; in taking a recycle stream from exit the phenol removal carbon beds to use as a primary equipment wash and completing equipment wash with a small fresh water stream; using a recycle wash stream in the melamine-phenol equipment wash with a small clean water wash in order to allow a precipitation removal of much of the melamine-phenol; and using a formaldehyde urotropination reaction catalyzed by carbon ahead of final carbon clean up beds; these carbon clean up beds then causing completion of the urotropination reaction and removing dissolved melamine and the urotropine formed by reacting the formaldehyde with ammonia. Thus the final process could be considered a treatment of one stream to remove some phenol and formaldehyde; the treatment of the other to remove formaldehyde and melamine in combination and a final urotropination of either or both streams to change formaldehyde to a state to be removed by carbon adsorption.

We have considered the following patents that are relevant to parts of our process:

| No. | | |
|---|---|---|
| No. 1,866,417 | Mackert | 1932 |
| No. 3,855,123 | Strudgeon | 1974 |
| No. 3,869,387 | Vargia | 1975 |
| No. 4,113,615 | Gorboty | 1978 |
| No. 4,216,088 | Juferov | 1980 |
| No. 79,109,249 | Japan, Kokai, Tokkyo Koho | 1979 |
| No. 7,890,178 | Japan, Kokai | 1978 |

We have described the novel approach developed to economically remove formaldehyde and phenol from one waste water wash stream and to remove melamine and formaldehyde from a second waste water wash stream. In the following paragraphs we will describe pertinent research work: Consider first the wash stream from washing phenol-formaldehyde plastic manufacturing equipment. Commonly a caustic type cleaner is mixed with water to wash the equipment. We found that we could adjust the pH of this stream to about 8 and then hold up with stirring to produce a precipitate from reacting the phenol and formaldehyde. After filtering this solution to remove the precipitate the liquid would contain approx. 1000–1500 ppm phenol and up to 100 ppm formaldehyde. After removing phenol in carbon beds we could recycle the stream containing formaldehyde to do the bulk of the equipment wash and follow with a fresh water clean up wash to complete the washing. This recycle would increase formaldehyde concentration to over 1000 ppm. This allowed decreasing the flow from this system to the next step which was reaction of the formaldehyde with ammonia; a simple inexpensive reaction that could be done in relatively small equipment when we found that carbon would catalyze the reaction. Theoretical considerations indicate that the reaction of formaldehyde with ammonia would most nearly approach complete formaldehyde removal with 1. low temperature
2. high ammonia ion concentration
3. high pH or low hydrogen ion concentration Theoretical calculations would indicate the following relationships when treating a solution containing 900 parts per million formaldehyde at 25° C. with various ammonia concentrations and various pH values:

| Ammonia Ion (moles/liter) | pH | Final unreacted Formaldehyde (ppm) |
|---|---|---|
| 30 | 8 | 0.3 |
| 0.3 | 10 | 0.3 |
| 0.03 | 11 | 0.3 |

Such theoretical calculations indicate the final or equilibrium point of the reaction but do not indicate speed of the reaction. A catalyst, by definition, speeds up a reaction but does not change the final equilibrium. In this case the final equilibrium of 0.3 ppm would be more than sufficient removal of formaldehyde to allow discharge to the normal run off stream.

Activated carbon was tested for catalytic activity with results as follows:

| Initial HCHO Conc. (ppm) | pH | Ammonia/ HCHO Ratio | Reaction Time @ 25 C (hrs) | Gms C Added/ Liter | Final HCHO Conc (ppm) |
| --- | --- | --- | --- | --- | --- |
| 500 | 11 | 5:1 | 16 | 0 | 8 |
| 500 | 11 | 5:1 | 16 | 0 | 13 |
| 500 | 11 | 5:1 | 16 | 0 | 17 |
| 500 | 11 | 5:1 | 16 | 50 | 3 |
| 500 | 11 | 5:1 | 16 | 50 | 5 |
| 500 | 11 | 5:1 | 16 | 50 | 3 |

From the final column showing residual formaldehyde we see that with 50 grams of carbon per liter in three samples and no carbon in the other three that the average residual formaldehyde without carbon was about 13 ppm while with carbon the formaldehyde residual was about 4 ppm. all conditions other than carbon were the same in all six samples.

Activated carbon used in the urotropination experiments was re-used several times with little loss of catalytic activity as evidenced by continued low residual formaldehyde.

In another test a solution containing 500 ppm formaldehyde was divided into two equal parts; each part treated with 1:1 moles of ammonia per mole of formaldehyde; each adjusted to pH 10 with sodium hydroxide and 15 grams of carbon per liter was added to one part. Free formaldehyde in ppm in each sample diminished as follows:

| Time (hrs) | Part 1 (no carbon) | Part 2 (with carbon) |
| --- | --- | --- |
| 0 | 500 | 500 ppm |
| ½ | 200 | 125 ppm |
| 1 | 175 | 100 ppm |
| 2 | 175 | 60 ppm |
| 3 | 175 | 55 ppm |
| 4 | 175 | 50 ppm |

Note that in four hours with the conditions outlined that the reaction had leveled out with about 175 ppm residual formaldehyde with no added carbon; with only 15 grams per liter of carbon the residual formaldehyde was reduced to 50 ppm with the reaction continuing.

These results further confirmed catalytic activity of carbon and also, when compared with previous results, desireability of pH 11 and higher mole ratio of ammonia to formaldehyde.

Testing of fresh field sample containing melamine and formaldehyde indicated interference and variable results when treated at pH 11 with 5:1 moles of ammonia per mole of formaldehyde so that direct reaction to form urotropin from the formaldehyde was not feasible. However samples held in barrels more than one month and filtered indicated total dissolved solids of about 10 mg./ml. consistently and could be treated to form a urotropine as described above. Now in order to speed up the "aging process" we found that we could adjust the pH to 4.5 and heat above 50° C. for more than 2 hours and filter. Again we found the filtrate to contain approx. 10 mg/ml of total dissolved solids; further the filtrate could then be successfully treated to tie up the formaldehyde as urotropine.

Further we found that fresh samples could be adjusted to pH 4.5 and held at room temperature for 2 days, filtered and successfully treated. Experimentation indicated pH of 4.5 to be the optimum pH to secure greatest precipitation of the interfering melamine-formaldehyde.

Using the treatment described we found that approx 70 liters of urotropination reactor effluent could be fed through 1200 grams of carbon in a first 3" column and through 930 grams of carbon in a second 3" column at the rate of approx. 95 ml/min before formaldehyde in the effluent exceeded 3 ppm. The feed to the column contained 1% melamine, 230 ppm urotropine, 23 ppm formaldehyde, approx. 3000 ppm sodium hydroxide and 3500 ppm ammonium chloride. Results showing leakage of formaldehyde and urotropine are shown in Table 1 below

TABLE 1

Fixed Bed Carbon Adsorption of Urotropin
1% Melamine

| Cum. Time hrs | Flow Rate ml/mn | Cum. Flow ltr | Column I Urotropine ppm | Column I HCHO ppm | Column II Urotropine ppm | Column II HCHO ppm | TDS mg/g |
| --- | --- | --- | --- | --- | --- | --- | --- |
| 0 | 97.0 | 0 | — | — | — | — | — |
| 1 | 95.5 | 5.8 | 3.9 | 0 | 2.9 | 0.0 | 4.2 |
| 2 | 96.5 | 11.6 | — | — | 4.7 | — | 4.3 |
| 3 | 96.0 | 17.3 | 3.9 | 8.4 | 4.8 | 0.0 | 4.3 |
| 4 | 94.0 | 23.0 | — | — | 8.6 | — | 4.3 |
| 5 | 84.0 | 28.0 | 39 | 7.2 | 3.9 | 1.2 | 4.3 |
| 6 | 88.0 | 33.3 | — | — | 8.6 | — | 4.3 |
| 7 | 96.0 | 39.1 | 125 | 13.2 | 8.2 | 0.0 | 4.3 |
| 8 | 94.5 | 44.7 | — | — | 11. | — | 4.3 |
| 9 | 89.0 | 50.1 | 159 | 9.6 | 4.0 | 2.4 | 4.3 |
| 10 | 92.0 | 55.6 | — | — | 11. | — | 4.3 |
| 11 | 92.0 | 61.1 | 184 | 8.4 | 30. | 1.2 | 4.3 |
| 12 | 90.0 | 66.5 | — | — | 76. | — | 4.5 |
| 13 | 91.0 | 72.0 | 229 | 11.0 | 125 | 3.6 | 4.8 |
| 14 | 91.5 | 77.5 | — | — | 124 | — | 5.3 |
| 15 | 88.0 | 82.7 | 187 | 9.6 | 154 | 7.2 | 5.7 |
| 16 | 90.0 | 88.1 | — | — | 136 | — | 6.1 |
| 17 | 87.5 | 93.4 | 219 | 9.6 | 222 | 7.2 | 6.4 |
| 18 | 91.0 | 98.8 | — | — | — | — | 6.7 |
| 19 | 89.5 | 104.2 | 210 | 9.6 | 202 | 14 | 6.8 |
| 20 | 86.0 | 109.4 | — | — | — | — | 7.0 |
| 21 | 91.0 | 114.8 | — | — | 222 | 16 | — |
| 22 | 90.0 | 120.2 | — | — | — | — | — |
| 23 | 89.5 | 125.6 | — | — | 222 | 12 | — |

TABLE 1-continued

| | | | Fixed Bed Carbon Adsorption of Urotropin 1% Melamine | | | | |
|---|---|---|---|---|---|---|---|
| | | | Column I | | Column II | | |
| Cum. Time hrs | Flow Rate ml/mn | Cum. Flow ltr | Urotropine ppm | HCHO ppm | Urotropine ppm | HCHO ppm | TDS mg/g |
| 24 | 88.0 | 130.9 | — | — | — | — | — |

Note that the inlet feed contained 23 ppm formaldehyde along with excess ammonia and sodium hydroxide or proper chemical conditions for further reaction of formaldehyde and ammonia.

Consideration of these results show that:

a. the total dissolved solids of 4.3 mg/gm exactly equals the sodium chloride which would be formed from the ammonium chloride and sodium hydroxide in the feed; the ammonium hydroxide formed would volatilize during evaporation in the analytical process to determine total dissolved solids; thus we see that all the melamine was removed until about seventy-two liters of the stream was processed; because melamine, if present, would add to the total dissolved solids.

b. formaldehyde itself does not adsorb on carbon so that removal of formaldehyde proceeded through reaction to urotropine and adsorption of the urotropine on the carbon thus driving the urotropination to completion or by catalytic activity of additional carbon in the beds or by combination of these mechanisms.

Thus carbon bed removal of urotropine removes melamine, urotropine, and completes the urotropination reaction to remove formaldehyde and remove the additional urotropine formed.

STATEMENT OF THE INVENTION

This invention pertains to a process for removing formaldehyde, phenol, and melamine from wash streams in a commercially feasible manner. Phenol and melamine may be removed by adsorption on carbon beds but formaldehyde itself is adsorbed very little on a carbon bed. In order to remove formaldehyde along with melamine by simple carbon adsorption we have found that formaldehyde may be reacted with ammonia to form hexamethylene tetramine, or urotropine, that then adsorbs readily on carbon. Further we have found that powdered carbon catalyzes the urotropine reaction and carbon bed removal of urotropine completes the urotropination reaction. The process is particularly suited to rendering equipment wash streams from melamine-formaldehyde plastic manufacture and phenol-formaldehyde plastic manufacture suitable for discharge to a sewer or to natural run-off streams in an economic manner.

The invention comprises:

A. pretreatment of the phenol-formaldehyde wash stream by adjusting pH to less than 9; holding up with stirring to partially precipitate the phenol and formaldehyde; separating the precipitate; carbon bed treating the separation effluent to remove phenol; recycling a portion of the phenol free effluent for equipment primary wash; and feeding a portion to a urotropination step where pH is adjusted to above 10 in the presence of a large excess of ammonia to react with formaldehyde to form urotropine B. pretreatment of the melamine-formaldehyde stream at pH of about pH 4.5 with hold up for about 48 hours to precipitate melamine and formaldehyde reaction products or hold up for about 2 hours above 50° C. to cause a similar precipitation; filtration and partial recycle of the filtrate with the remainder being sent to a urotropination step to react formaldehyde with an excess of ammonia at a pH above 10

C. treatment of either or both streams from the pretreatment steps by adding sufficient ammonia, which may be in the form of ammonium chloride, to be equal to about five moles of ammonia per mole of formaldehyde; adjusting pH to above 10 with sodium hydroxide; adding powdered carbon; holding up the described reactants in a stirred vessel for about 10 hours and finally feeding through carbon beds D. arranging carbon beds in series to allow complete loading of the first replaceable carbon bed to minimize use of carbon.

Figure 1:
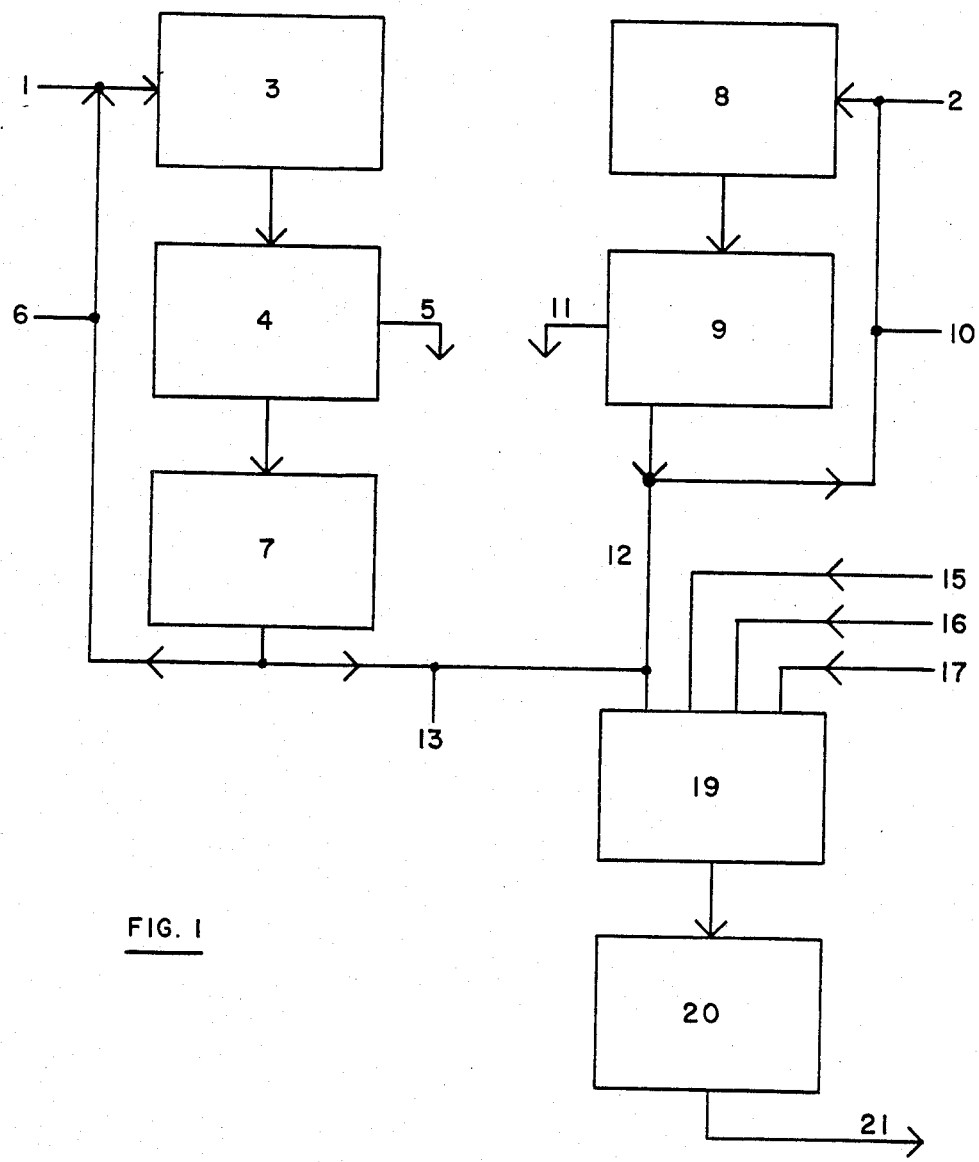
FIG. 1 shows the flowsheet in block flow form. The formaldehyde-phenol waste stream 1 flows into a reactor 3 where the formaldehyde-phenol reaction may remove part of each as a precipitate. The effluent is then fed through a filtration step 4 and the liquid is fed through carbon beds 7 for phenol removal. Part of the effluent 6 may then be recycled for use on equipment wash and part fed through a urotropination reaction 19 to change the formaldehyde to urotropine; with effluent from urotropination then going through a carbon bed urotropine removal 20 and thence to waste 21.

The melamine-formaldehyde waste stream 2 is fed to a reactor step 8 with conditions so as to cause completion of melamine-formaldehyde reaction to form a precipitate which may be removed in a filtration step 9, a part of the effluent 10 from the filtration step 9 is recycled for use as equipment wash; the remainder is fed to the urotropination step 19 and then to the carbon bed urotropine removal step 20 where the urotropination reaction is completed and where both melamine and urotropine are removed prior to discharge.

The process as briefly described may be used for treating either waste stream separately or both waste streams simultaneously with urotropination and carbon bed removal of urotropine or urotropine plus melamine being common to both streams.

DETAILED DESCRIPTION OF THE DRAWINGS

The stream 1 contains formaldehyde and phenol picked up from washing formaldehyde-phenol resin manufacturing equipment. The stream is highly alkaline. In step 3 the stream is adjusted to a pH less than 9 by adding sulfuric acid and held up with stirring to allow formation of a phenol-formaldehyde precipitate. Powdered carbon may be added to improve the filterability of the precipitate and to adsorb some unreacted phenol. In step 4 the effluent from step 3 is filtered or otherwise separated with precipitate 5 discharged to be landfilled or incinerated. The fluid effluent from the filtration step 4 is fed to carbon bed phenol removal, step 7. An advantageous carbon bed arrangement is to have three carbon beds in series with piping so that the feed may start at either end. Thus when leakage of phenol from the terminal bed starts the flow may be stopped and the beginning carbon bed which will be fully loaded with phenol may be replaced. The feed may then be changed so that the newly installed carbon bed becomes the terminal or clean-up bed. A portion of the effluent 6 from the filtration step 7 may be partially recycled, and used as an equipment wash with a final small fresh water wash to complete the washing of the equipment. In this manner the concentration of formaldehyde will be increased and the liquid flow 13 going to the urotropination reactor 19 will be decreased.

Now the melamine-formaldehyde stream 2 may be treated in step 8 and step 9 to form stream 12 which may be combined with stream 13 to feed the urotropination reactor 19 which we will describe later. Stream 2, which is water wash from melamine-formaldehyde resin equipment, contains melamine-formaldehyde prepolymers and free melamine and free formaldehyde. In step 8 the stream 2 is adjusted to a pH of 4.5 and treated above 50° C. in a stirred reactor large enough to provide at least a two hour hold-up to cause precipitation of formaldehyde and melamine. Alternatively the stream 2 may be adjusted to pH of about 4.5 and held up at room temperature for about 48 hours to allow equivalent precipitation of melamine-formaldehyde. Thus we have alternative treatment steps in step 8. Effluent from step 8 is fed through a filtration or solids removal step 9. Solids 11 from the filtration step may be land filled or incinerated. The separation in this step 9 or in filtration step 7 may be conveniently accomplished with readily available commercial filters. For small intermittent flows a plate and frame filter is adequate; for larger flows a precoated rotary filter or centrifugal separation could be considered. The choice would be easily made by one skilled in the Chemical Engineering arts.

Flow to the urotropination reactor may be stream 13 where only stream 1, wash from phenol-formaldehyde resin equipment, is treated; or may be only stream 12 where only stream 2, wash from melamine-formaldehyde equipment, is treated; or streams 12 and 13 may be combined.

We have not shown holdup tanks for these streams since this would be optional with the user. It is necessary to determine the approximate formaldehyde concentration going into the urotropination reactor 19. Stream 15, ammonia or ammonium hydroxide, flow to the urotropination reactor 19 is controlled to give about 5 moles of ammonia per mole of formaldehyde entering the reactor. Stream 16 is dilute caustic and is used to hold the reactor contents at about pH of 11. Stream 17 is activated carbon which is added to an amount equal to about five percent of the reactor volume. This activated carbon acts to catalyze the urotropine reaction. The effluent from step 19 goes to step 20 where activated carbon beds complete the urotropination reaction and act to remove unreacted melamine and to remove the urotropine or hexamethylene-tetramine formed in the urotropination reactor 19. Again three carbon beds in series with piping to feed either end as the first bed will be advantageous. Effluent from the carbon beds in step 20 is fed to a holdup tank 21. The holdup tank allows easy checking of phenol and formaldehyde to make certain removal is essentially complete and meets the governmentally required standards for discharge. Alternatively continuous monitoring could be used and the holdup tank would not be required.

What is claimed is:

1. A clean up process for removing melamine, formaldehyde, and phenol from a first wash stream containing phenol and formaldehyde and a second wash stream containing melamine and formaldehyde comprising:
    A. adjusting the pH of said first wash stream in a first reactor to a pH below 9 and holding in said first reactor with stirring until a precipitate forms, thereafter,
    B. feeding said first reactor effluent through first separation equipment,
    C. feeding said first separation equipment aqueous effluent through a first set of carbon beds to remove phenol,
    D. adjusting the pH of said second wash stream containing melamine and formaldehyde in a second reactor to a pH of about 4.5 and holding at a temperature above 50 degrees centigrade for a minimum of two hours,
    E. feeding effluent from said second reactor through a second separation equipment,
    F. feeding said second separation equipment aqueous effluent to a stirred urotropination reactor along with an effluent from said first set of carbon beds,
    G. adding ammonia above stoichiometric amounts to said second separation equipment aqueous effluent and combined with said first set of carbon bed effluent being fed to said stirred urotropination reactor, maintaining said stirred urotropination reactor contents at a pH above 9 by adding a base and holding up for about 10 hours, and
    H. feeding said stirred urotropination reactor effluent through carbon beds to remove melamine, and urotropine formed in said stirred urotropination reactor.

2. A clean up process for removing melamine, formaldehyde, and phenol from a first wash stream containing phenol and formaldehyde and a second wash stream containing melamine and formaldehyde as in claim 1 further comprising recycling a portion of said first set of carbon bed effluent to wash equipment containing formaldehyde and phenol.

3. A clean up process for removing melamine, formaldehyde, and phenol from a first wash stream containing phenol and formaldehyde and a second wash stream containing melamine and formaldehyde as in claim 1 where a portion of said second separation equipment aqueous effluent is recycled to wash equipment containing melamine and formaldehyde.

4. A clean up process for removing melamine, formaldehyde, and phenol from a first wash stream containing phenol and formaldehyde and second wash stream containing melamine and formaldehyde as in claim 1 where, after adjusting the pH of said second wash stream containing melamine and formaldehyde to about 4.5, said second wash stream is held up at room temperature for a period of greater than twenty-four hours.

5. A clean up process for removing melamine, formaldehyde, and phenol from a first wash stream containing phenol and formaldehyde and a second wash stream containing melamine and formaldehyde as in claim 1 further comprising adding powdered carbon to said stirred urotropination reactor.

6. A clean up process for removing melamine, formaldehyde, and phenol from a first wash stream containing phenol and formaldehyde and a second wash stream containing melamine and formaldehyde as in claim 1 where said first separation equipment and said second separation equipment are both filters.

7. A clean up process for removing melamine and formaldehyde from a wash stream comprising:
   A. adjusting the pH of said wash stream in a stirred reactor to a pH of about 4.5 and holding at a temperature above 50 degrees centigrade for a minimum of two hours,
   B. feeding effluent from said stirred reactor through separation equipment,
   C. feeding said separation equipment aqueous effluent to a stirred urotropination reactor,
   D. adding ammonia equivalent to up to five moles of ammonia per mole of formaldehyde in said separation equipment effluent; maintaining said stirred urotropination reactor contents at a pH above 9 by adding sodium hydroxide and holding up about 10 hours, and,
   E. feeding said stirred urotropination reactor effluent through carbon beds to remove melamine and urotropine formed in said stirred urotropination reactor.

8. A clean up process for removing melamine and formaldehyde as in claim 7 where said separation equipment is a filter.

9. A clean up process for removing phenol and formaldehyde from a wash stream comprising:
   A. adjusting the pH of said wash stream containing phenol and formaldehyde to a pH below 9 and holding in a stirred reactor until a precipitate forms,
   B. feeding said stirred reactor effluent through separation equipment,
   C. feeding said separation equipment aqueous effluent through a first set of two carbon beds to remove phenol,
   D. adding ammonia equivalent to up to five moles of ammonia per mole of formaldehyde to said carbon bed aqueous effluent while feeding said carbon bed aqueous effluent to a stirred urotropination reactor; maintaining said stirred urotropination reactor contents at a pH above 9 by adding sodium hydroxide and holding up for about 10 hours, and
   E. feeding said stirred urotropination reactor effluent through a second set of carbon beds to remove urotropine.

10. A clean up process for removing phenol and formaldehyde as in claim 9 where said separation equipment is a filter.

* * * * *